(12) United States Patent
Chitsaz et al.

(10) Patent No.: US 10,103,604 B2
(45) Date of Patent: Oct. 16, 2018

(54) ROTATING RECTIFIER ASSEMBLY FOR ELECTRIC MACHINE

(71) Applicant: GE Aviation Systems LLC, Grand Rapids, MI (US)

(72) Inventors: Bijan Chitsaz, Springboro, OH (US); Joseph Kenneth Teter, Dayton, OH (US); Darrell Morgan Bybee, Beavercreek, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 1103 days.

(21) Appl. No.: 14/329,004

(22) Filed: Jul. 11, 2014

(65) Prior Publication Data

US 2016/0013707 A1    Jan. 14, 2016

(51) Int. Cl.
*H02K 11/04* (2016.01)
*H02K 19/38* (2006.01)
*H02K 9/00* (2006.01)
*H02K 11/042* (2016.01)

(52) U.S. Cl.
CPC .................. *H02K 11/042* (2013.01)

(58) Field of Classification Search
CPC .................................................. H02K 11/042
USPC ...... 310/68 D, 54, 61, 58, 59; 363/107, 108, 363/145
See application file for complete search history.

(56) References Cited

U.S. PATENT DOCUMENTS

| | | | |
|---|---|---|---|
| 2,525,495 A * | 10/1950 | Lynn | H02K 19/38 310/59 |
| 3,348,127 A | 10/1967 | Petersen | |
| 3,577,002 A * | 5/1971 | Hall | H02K 7/003 290/46 |
| 4,745,315 A | 5/1988 | Terry, Jr. et al. | |
| 5,001,376 A | 3/1991 | Iseman | |
| 5,319,272 A * | 6/1994 | Raad | H02K 11/042 310/54 |
| 5,414,318 A | 5/1995 | Shimizu et al. | |
| 6,903,470 B2 | 6/2005 | Doherty et al. | |
| 7,166,943 B2 | 1/2007 | Johnsen | |
| 7,944,100 B2 * | 5/2011 | Lemmers, Jr. | H02K 11/042 29/592.1 |
| 2003/0164651 A1 | 9/2003 | Tornquist et al. | |

(Continued)

FOREIGN PATENT DOCUMENTS

EP    1788693 B1    9/2009
GB    1183291 A     2/1968

(Continued)

OTHER PUBLICATIONS

GB Combined Search and Examination Report issued in connection with corresponding Application No. GB1403209.8 on Augus.
Written Opinion for PCT/US2013/043814 dated Mar. 4, 2014.

*Primary Examiner* — Bernard Rojas
*Assistant Examiner* — Ahmed Elnakib
(74) *Attorney, Agent, or Firm* — GE Aviation Systems LLC; William Andes

(57) ABSTRACT

An electric machine assembly, having a first machine providing an alternating current output and a second machine receiving a direct current input, and a rectifier assembly placed within a rotating shaft of the electric machine assembly to convert the AC output of the electric machine assembly to the DC input prior to transmission of the electricity from the electric machine assembly.

11 Claims, 5 Drawing Sheets

(56) References Cited

U.S. PATENT DOCUMENTS

| | | |
|---|---|---|
| 2010/0019628 A1 | 1/2010 | Kitzmiller et al. |
| 2010/0283357 A1 | 11/2010 | Lemmers, Jr. et al. |
| 2011/0296672 A1 | 12/2011 | Ganong et al. |
| 2014/0210320 A1* | 7/2014 | Wirsch, Jr. ............ H02K 11/04 310/68 D |
| 2015/0180317 A1* | 6/2015 | Chitsaz ................... H02K 1/32 310/68 D |
| 2015/0295479 A1* | 10/2015 | Chitsaz ............... H02K 11/046 310/68 D |

FOREIGN PATENT DOCUMENTS

| | | | |
|---|---|---|---|
| GB | 1183291 | * | 3/1970 |
| GB | 1507755 | * | 4/1978 |
| GB | 1507755 A | | 4/1978 |
| GB | 2015252 A | | 9/1979 |
| JP | 2005320086 A | | 11/2005 |
| WO | 9013144 A1 | | 11/1990 |

* cited by examiner

ROTATING RECTIFIER ASSEMBLY FOR ELECTRIC MACHINE

BACKGROUND OF THE INVENTION

Electric machines, such as electric motors and/or electric generators, may be used in the generation of electricity. In the aircraft industry, it is common to find combination motors/generators, where the motor is periodically used to power the generator depending on the configuration and application. Regardless of the configuration, generators typically include a generator rotor having main windings that are driven to rotate by a source of rotation, such as an electrical or mechanical machine, which for some aircraft may be a gas turbine engine. In some applications, the generators initially generate alternating current (AC), which is rectified to generate direct current (DC) for DC components on the aircraft.

BRIEF DESCRIPTION OF THE INVENTION

A rectifier assembly for placement within a rotating shaft of an electric machine assembly having a first machine providing an alternating current output and a second machine receiving a direct current input, with the rectifier assembly converting the alternating current output to the direct current input, includes opposing first and second conductive segments extending in an axial direction, axially-spaced, non-conductive supports coupling the first and second conductive segments to define an interior between the first and second conductive segments, a set of axially aligned diode seats comprising a first diode seat disposed on the first conductive segment and facing the interior, and a second diode seat disposed on the second conductive segment and facing the interior, and a diode stack comprising a first diode seated with the first diode seat and a second diode seated with the second diode seat, each diode having an input electrically coupled with the alternating current output and outputs electrically coupled with each respective conductive segments.

DESCRIPTION OF EMBODIMENTS OF THE INVENTION

Embodiments of the invention may be implemented in any environment using an electric motor regardless of whether the electric motor provides a driving force and/or generates electricity. For purposes of this description, such an electric motor will be generally referred to as an electric machine, electric machine assembly, or similar language, which is meant to make clear that one or more stator/rotor combinations may be included in the machine. While this description is primarily directed toward an electric machine providing power generation, it is also applicable to an electric machine providing a driving force and/or an electric machine providing both a driving force and power generation. Further, while this description is primarily directed toward an aircraft environment, embodiments of the invention are applicable in any environment using an electric machine or power generator.

Figure 1:
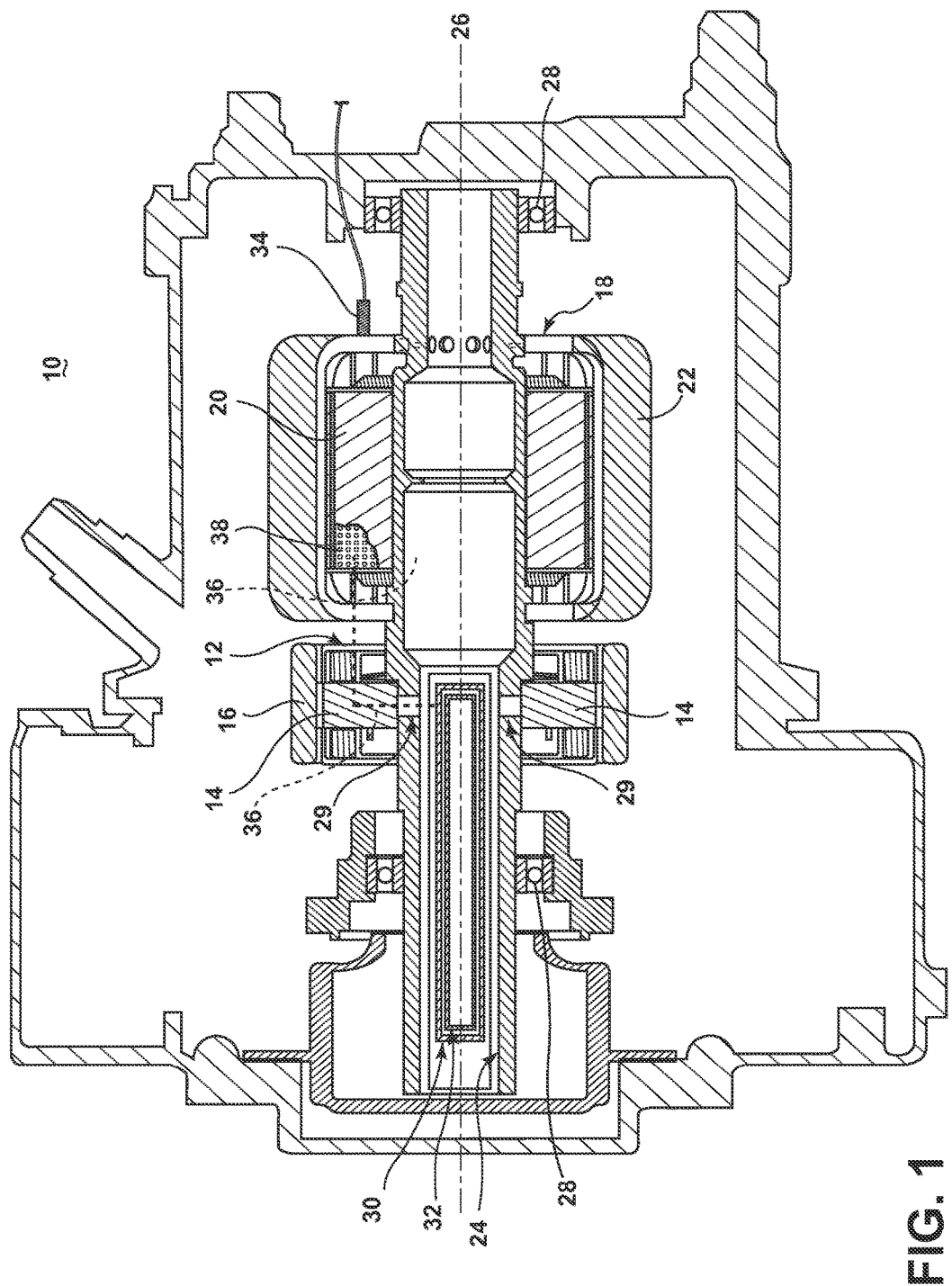
FIG. 1 is a cross-sectional view of an electrical machine assembly.

Turning to an exemplary embodiment of the invention, FIG. 1 schematically illustrates an electrical machine assembly 10 comprising a first machine 12 having an exciter rotor 14 and an exciter stator 16, and a second machine 18 having a main machine rotor 20 and a main machine stator 22. At least one power connection is provided on the exterior of the electrical machine assembly 10 to provide for the transfer of electrical power to and from the electrical machine assembly 10. Power is transmitted by this power connection, shown as an electrical power cable 34 extending from the main machine stator 22, to the electrical load and may provide for a three phase with a ground reference output from the electrical machine assembly 10.

The electrical machine assembly 10 further comprises a rotatable shaft 24 mechanically coupled to a source of axial rotation, which may be a gas turbine engine (not shown), about a common axis 26. The rotatable shaft 24 is supported by spaced bearings 28 and includes access openings 29 radially spaced about the shaft 24. The exciter rotor 14 and main machine rotor 20 are mounted to the rotatable shaft 24 for rotation relative to the stators 16, 22, which are rotationally fixed within the electrical machine assembly 10. The stators 16, 22 may be mounted to any suitable part of a housing portion of the electrical machine assembly 10.

The rotatable shaft 24 further comprises at least a hollow portion for enclosing a shaft tube 30, which is contemplated to be non-conducting. The shaft tube 30 is rotationally coupled for co-rotating with the rotatable shaft 24 and further houses a rectifier assembly 32, insulating the rectifier assembly 32 from the rotatable shaft 24. It is envisioned that the rotatable shaft may comprise any suitable electrically non-conductive material.

The exciter rotor 14 is electrically connected to the rectifier assembly 32 by way of conductors 36 (schematically shown as dotted lines). Additionally, the rectifier assembly 32 is electrically connected to the main windings 38 of the main machine rotor 20 by way of conductors 36.

Figure 2:
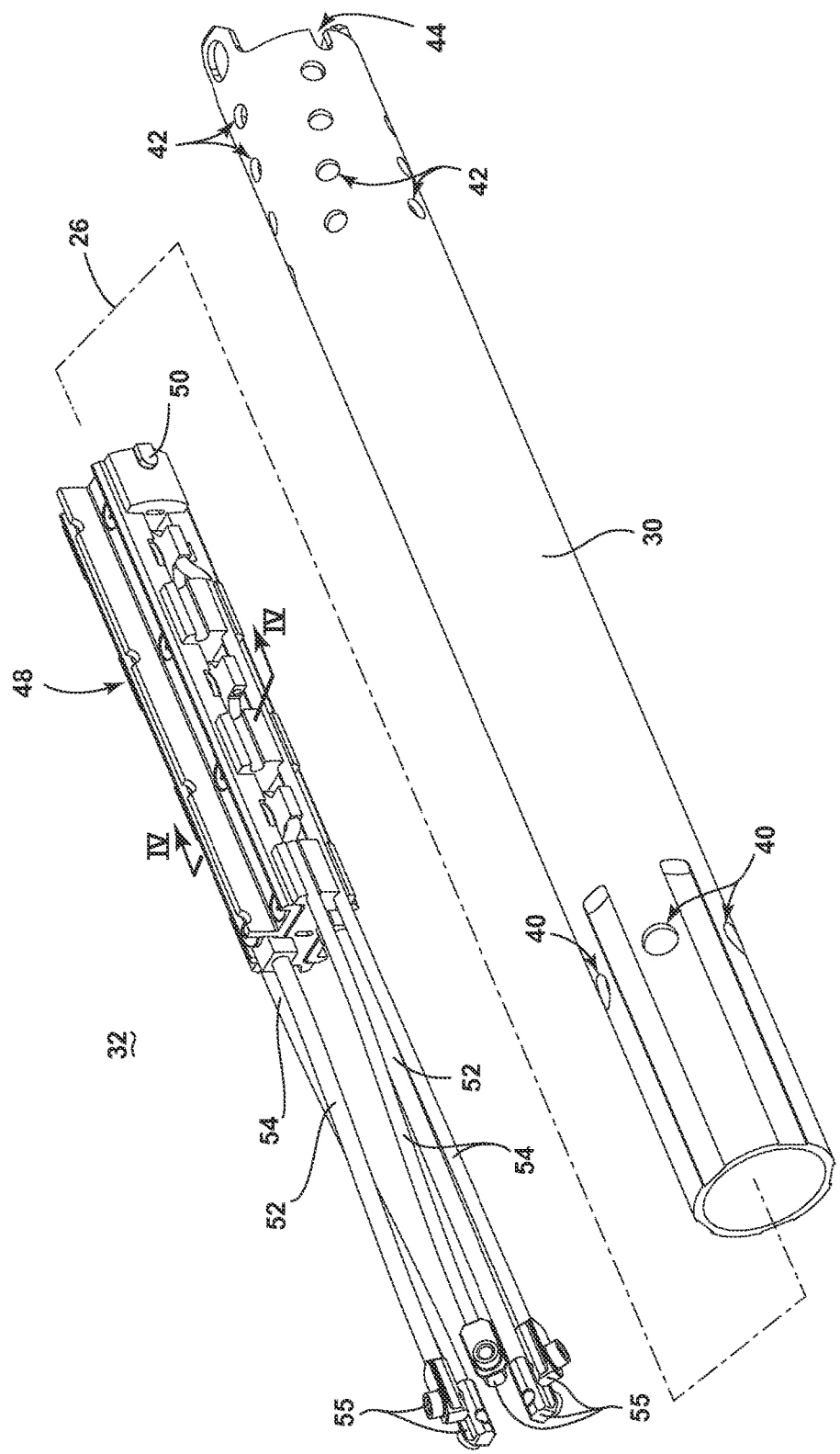
FIG. 2 is a perspective view of the rectifier assembly and the shaft tube.

Turning now to FIG. 2, the details of the shaft tube 30 and the rectifier assembly 32 will be described. The shaft tube 30 has a substantially cylindrical structure with opposing open ends, and includes five mounting connector openings 40 spaced radially near an end of the shaft tube 30. The shaft tube 30 is also shown having optional access openings 42, some of which may be radially aligned for accessing portions of the rectifier assembly 32. The shaft tube 30 is shown further comprising optional keyed recesses, or keyway openings 44, at the axial end of the shaft tube 30, opposite of the mounting connector openings 40.

The rectifier assembly 32 comprises a rectifying structure 48 and a plurality of electrically conductive bus bars 52, 54 shown radially spaced about the rotational axis 26, illustrated as two conductive DC bus bars 52 and three conductive AC bus bars 54. Embodiments of the invention may include one AC bus bar 54 for each phase of AC current output received from the first machine 12.

Each bus bar 52, 54 may comprise a first end having terminal connectors 55 for securing the respective DC and AC bus bars 52, 54 to the respective second and first machines 12, 18 by way of conductors 36. As illustrated, the terminal connectors 55 may be integrally formed and/or conjoined with the first end of the bus bars 52, 54. Alternatively, a fastener, such as a screw may be provided to aid in the mounting of the terminal connectors 55 to the first end of the bus bars 52, 54. Alternatively, non-mechanical fasteners, such as welding or adhesive may also be used. Embodiments of the invention may include DC and AC bus bars 52, 54 comprising any combination of flexible and/or inflexible conductive materials.

The rectifier structure 48 may also optionally comprise one or more assembly keys, shown as protrusions 50, which may be keyed to interact with the corresponding keyway openings 44 of the shaft tube 30. The protrusions 50 and keyway openings 44 are configured such that when the rectifier assembly 32 is inserted within the shaft tube 30, the protrusions 50 are radially keyed to be axially received within the keyway openings 44. Additionally, the terminal connectors 55 and mounting connector openings 40 are configured such that, when the shaft tube 30 and the rectifier assembly 32 are assembled and keyed based on the corresponding protrusions 50 and keyway openings 44, the connectors 55 are received by the openings 40 to provide for electrical coupling between the AC connectors 55 and the first machine 12, and the DC connectors 55 and the second machine 18.

Figure 3:
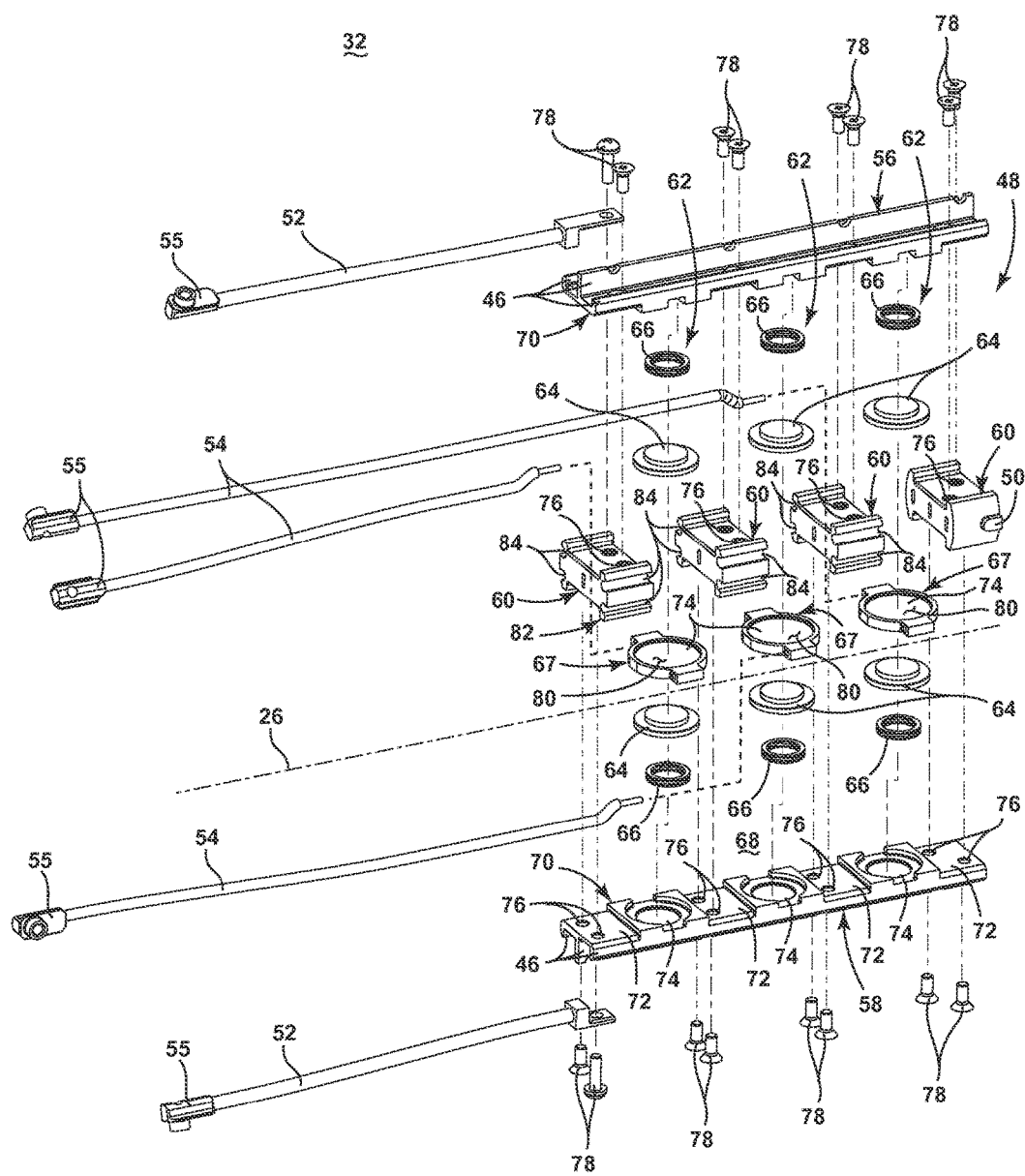
FIG. 3 is an axially exploded view of the rectifier assembly.

FIG. 3 illustrates an exploded view of the rectifier assembly 32. The rectifier structure 48 includes a first conductive segment 56 spaced from an opposing second conductive segment 58, with each conductive segment extending in an axial direction along the common axis 26. The conductive segments 56, 58 may be made of any suitable electrically and thermally conductive material, for example, aluminum.

The rectifier assembly 32 may further include a number of axially-spaced, electrically non-conductive supports 60 having at least one radially spaced guide channel, such as mounting connector 82, and a number of diode stack 62 configurations, wherein each diode stack 62 may further comprise one or more diodes 64, and conductive plates 67. The mounting connector 82 may further be defined by restraining elements, shown as semi-circular restraining arms or wire guides 84. Additionally, embodiments of the invention may include one diode stack 62 for each phase of AC current output received from the first machine 12. The illustrated example includes three phases of AC current, and thus, three diode stacks 62.

Each conductive segment 56, 58 may include an inwardly-facing facet 70, with respect to the common axis 26, which may further define a number of alternating non-conductive segment seats 72 and diode seats 74, for receiving, respectively, non-conductive segments 60 and diodes 64. The space between the inwardly-facing facets 70 defines an interior of the rectifier structure 48. Additionally, each conductive segment 56, 58 may optionally include thermally conductive cooling fins 46 positioned opposite of the inwardly facing facets 70 to provide for heat dissipation.

The seats 72, 74 are respectively disposed on each of the inwardly-facing facets 70 of the conductive segments 56, 58 in axially-aligned corresponding pairs. For example, a first non-conductive segment seat 72 disposed on the facet 70 facing the interior 68 of the first conductive segment 56 axially corresponds to, and is axially aligned with a second non-conductive segment seat 72 disposed on the facet 70 facing the interior 68 of the second conductive segment 58. Likewise, a first diode seat 74 disposed on the facet 70 facing the interior 68 of the first conductive segment 56 axially corresponds to, and is axially aligned with a second diode seat 74 disposed on the facet 70 facing the interior 68 of the second conductive segment 58. Each conductive segment 56, 57 may further include a fastening means, or coupling, made from any suitable mechanical or non-mechanical fasteners. In the illustrated example, the conductive segments 56, 58 are configured with, for example, a screw base 76, configured to receive a mechanical fastener, such as a threaded screw 78.

The conductive segments 56, 58 are spaced apart and electrically isolated from each other by the non-conductive supports 60, when assembled about the common axis 26. As shown, four supports 60, spaced along the axial length of the corresponding conductive segments 56, 58, may be received by corresponding non-conducting segment seats 72. Embodiments of the invention may include non-conductive segments 60 having additional screw bases 76 for receiving threaded screws 78, for securing that the rectifier structure 48 together.

Additionally, when assembled, each diode seat 74 may receive a diode 64 such that each diode 64 is electrically coupled with the respective conductive segment 56, 58. The opposing, axially aligned diodes 64 of a diode stack 62, corresponding to the axially aligned diode seats 74, may be further electrically coupled to each other by opposing faces 80 of the conductive plates 67, wherein each face 80 may be configured to include a diode seat 74 to receive the correspondingly adjacent diodes 64. One or more diode stacks 62 may further include one or more optional, conductive compressive elements, such as an aluminum spring 66, configured to maintain, by compressive force, the conductive contacts between each conductive segment 56, 58 and its respective diode 64, and between the diodes 64 and the conductive plate 67, for example, throughout conditions of high speed rotation. As shown, each diode stack 62 may include two springs 66, each respectively positioned in, and received by, the diode seats 74. While two springs 66 are illustrated in each diode stack 62, embodiments of the invention may include a single spring 66, or no spring. Additionally, alternative non-limiting placements of each spring 66 may be included in embodiments of the invention, such as, between a diode 64 and a conductive plate 67. When assembled, the non-conductive segments 60 and diode stacks may alternate along the axial length of the interior 68.

Each DC bus bar 52 is electrically coupled with a respective conductive segment 56, 58, for example, by way of a threaded screw 78 such that the DC bus bars 52 are configured to deliver the output DC voltage from the rectifier assembly 32 to the second machine 18. Alternatively, each DC bus bar 52 may be electrically coupled to the respective conductive segment 56, 57 at another mounting point. Alternative fixing methods and/or devices for assembling the above mentioned components are envisioned.

Additionally, each AC bus bar 54 may be individually electrically coupled with a respective conductive plate 67, for example, by brazing or crimping, such that each AC bus bar 54 is configured to receive the AC input voltage from the first machine 12 and deliver the AC voltage to the respective conductive plate 67. As shown, the AC bus bars 54 extending axially along the rectifier structure 48 may be configured such that the bars 54 may be receivably mounted by one or more of the mounting connectors 82. In this sense, the mounting connectors 82 may provide a suitable mounting coupling with the AC bus bars 54 wherein the mounting may electrically isolate the AC bus bars 54 from the conductive segments 56, 58 and diode stack 62 components, other than the conductive plates 67. The mounting connectors 82 may additionally prevent damage to the bars 54, for instance, from vibrations or slight movements of the bus bars 54 relative to the mounting connector 82.

The three diode stacks 62 are thus configured in a full bridge configuration, wherein voltage from each AC phase of the first machine 12 is delivered to one of the respective conductive plates 67 of the diode stacks 62. Each diode 64, in turn, is configured to receive the AC current input from the respective conductive plate 67, and rectify the AC current input to a DC current output. Each diode 64 then provides the rectified DC current output to a respective conductive segment 56, 58.

Figure 4:
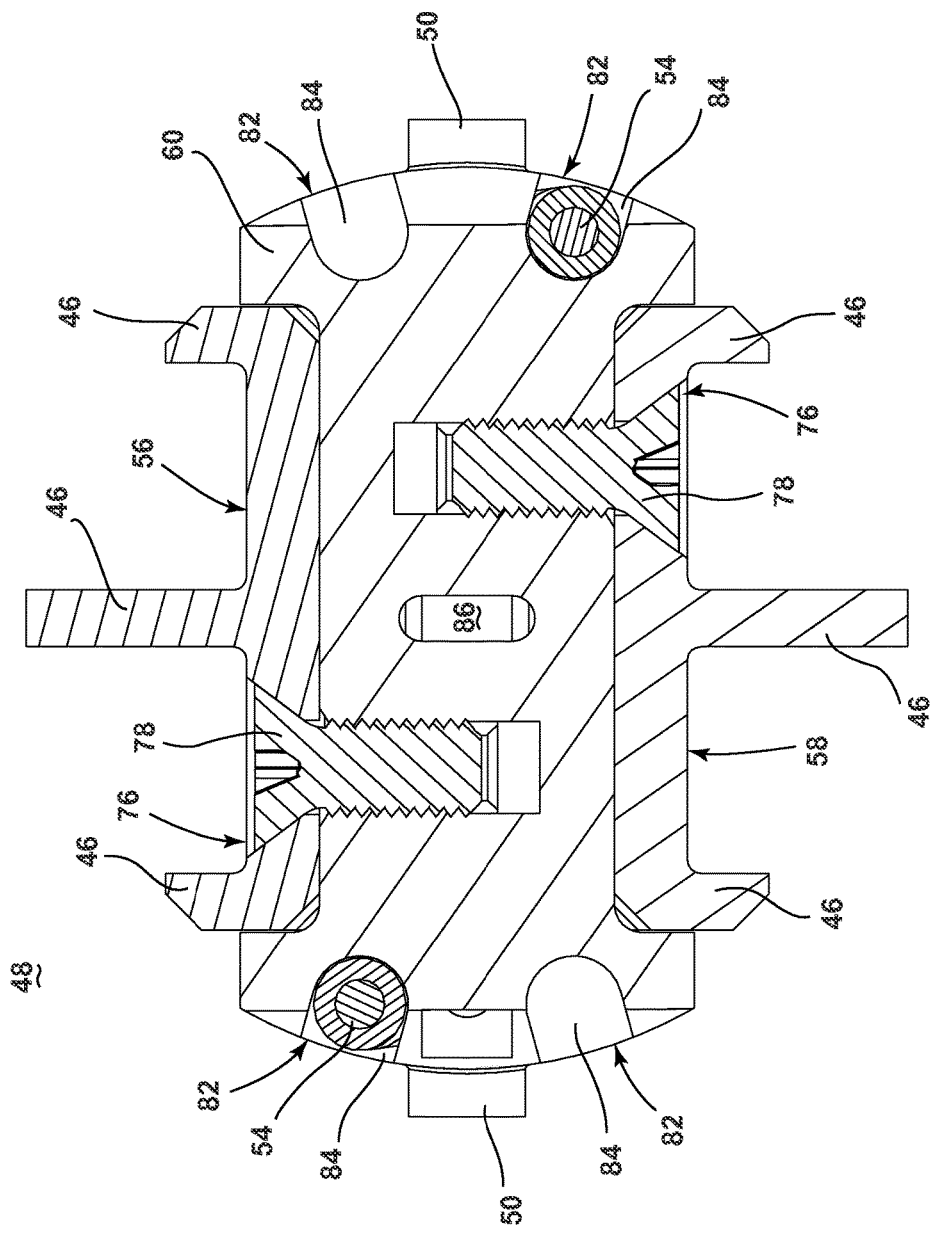
FIG. 4 is a partial sectional view taken along line 4-4 of FIG. 2 showing the non-conductive support assembly.

FIG. 4 illustrates a partial sectional view taken along line 4-4 of FIG. 2, showing finer detail of the axial cross section of an assembled rectifier structure 48, including the non-conductive support 60. As shown, the non-conductive support 60 may further include an axially configured opening 86 to allow for at least one passage for coolant to traverse through the rectifier structure 48.

The rectifier assembly 32 may then be axially inserted into the shaft tube 30 such that the keyed alignment of the keyway openings 44 and protrusions 50 also aligns the terminal connectors 55 of each bus bar 52, 54 with the respective mounting connector openings 40. The rectifier assembly 32 is further axially secured to the shaft tube 30 when the terminal connectors 55 are secured to the first and second machines 12, 18 through the mounting connector openings 40.

Figure 5:
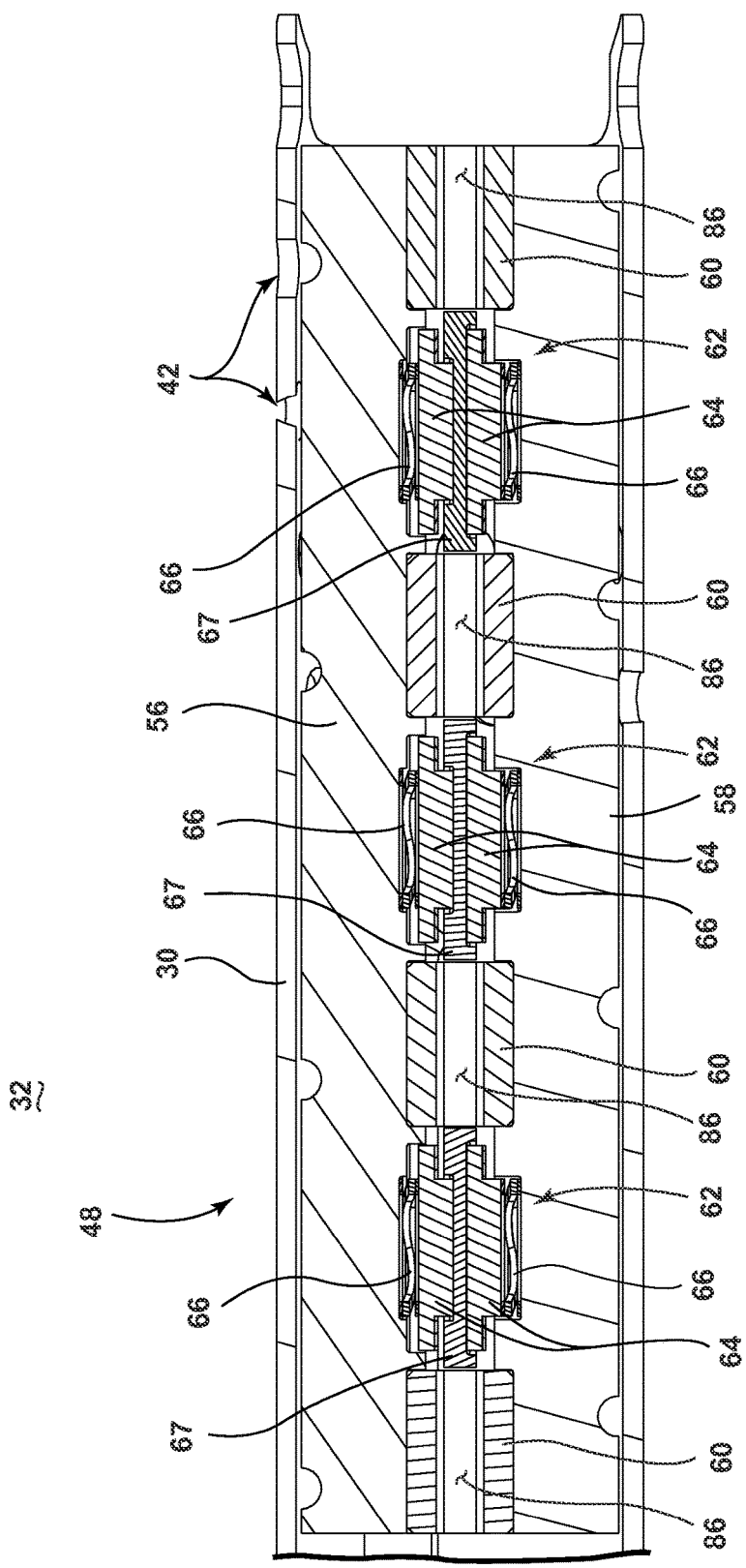
FIG. 5 is a cross-sectional view of a portion of the assembled rectifier assembly and the shaft tube.

FIG. 5 illustrates a cross-sectional view of the assembled rectifier structure portion of the rectifier assembly 32 coupled with the shaft tube 30. When fully assembled, it is envisioned that the rectifier assembly 32 is rotationally balanced, and thus allows for high speed rotation about the common axis 26.

During generator operation, the rotatable shaft 24 is driven by the source of axial rotation. The rotation of the mounted exciter rotor 14, adjacent to the exciter stator 16, generates a three-phase AC current, which is delivered to three respective AC input bus bars 54 by the conductors 36 and terminal connectors 55. Each phase of the AC current is transmitted from the bus bar 54 to a respective diode stack 62, whose electrical couplings are ensured by the compressive force of the springs 66 regardless of the rotational speeds. The diodes stacks 62 and diodes 64 operate to provide full wave rectification of the AC current to the DC current. The DC current from each diode 64 is transmitted through a corresponding conductive segment 56, 58 to the DC bus bar 52, where the DC current is further transmitted by the terminal connectors 55 and conductors 36 into the main windings 38 of the main machine rotor 20. The rotation of the main machine rotor 20 about the main machine stator 22 generates the electricity that is used to power the generator load.

In the instance where the rectifier assembly 32 is configured to allow fluid or liquid coolant to traverse the interior 68 (for example, via the opening 86) or exterior of the rectifier assembly 32, the coolant may operate to cool any transient or steady-state temperature conditions that develop at the conductive segments 56, 58 (for example, via the cooling fins 46), the diodes 64, and/or any of the bus bars 54, 52. Alternatively, the conductive segments 56, 58 may be configured to receive heat generated by the operation of the diodes 64, and the coolant may dissipate heat from the conductive segments 56, 58. Alternate coolant configurations are envisioned.

Many other possible embodiments and configurations in addition to that shown in the above figures are contemplated by the present disclosure. While substantially circular diodes 64 and diode seats 74 are illustrated, alternative shapes are envisioned. Additionally, alternative shapes of openings 86 and/or cooling fin 46 configurations, such as including grooves or additional openings, may allow for coolant and/or oil to transverse through the interior of, or about, the rectifier assembly 32. Furthermore, alternate arrangements and quantities of AC and DC bus bars 54, 52 are envisioned based on the needs and configuration of the electrical machine assembly 10.

In yet another embodiment of the invention, alternate configurations of forward or reverse-biased diode that may provide for full wave or half wave rectification. Another embodiment of the invention contemplates using a self-contained oil system for cooling, or air for cooling. In yet another embodiment of the invention, the shaft tube 30 may be made from either a conductive or non-conductive material to achieve further cost reduction. Furthermore, a different embodiment of the invention may forgo the shaft tube 30 altogether and provide for the rectifier assembly to be received directly into the rotatable shaft. Moreover, the design and placement of the various components may be rearranged such that a number of different in-line configurations could be realized.

One advantage that may be realized in the above embodiments is that the above described embodiments have superior weight and size advantages over the conventional type generator rectification systems. With the proposed rotating arrangement, current rectification can be achieved without the external space constraints of additional circuitry. Additionally, the construction and assembly of the rectifier will result in reduced maintenance downtime. Yet another advantage of the above embodiments is that the oil or coolant already present in the rotating shaft may be used to maintain the rectifier assembly, saving additional weight and size of a separate component. A further advantage of the above embodiments is that it reduces the risks of the diode electrically shorting to a metallic shaft. Moreover, due to the rotational balance of the rectifier assembly, a high peripheral speed can be achieved due to the reduced centrifugal forces of moving the assembly closer to the common axis of rotation. The higher peripheral speed results in a lower generator electromagnetic weight.

When designing aircraft components, important factors to address are size, weight, and reliability. The above described rectifier assembly has a decreased number of parts as the system will be able to provide rectified DC outputs with minimal power conversion equipment, making the complete system inherently more reliable. This results in a lower weight, smaller sized, increased performance, and increased reliability system. The lower number of parts and reduced maintenance will lead to a lower product costs and lower operating costs. Reduced weight and size correlate to competitive advantages during flight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rectifier assembly for placement within a rotating shaft of an electric machine assembly having a first machine providing an alternating current output and a second machine receiving a direct current input, with the rectifier assembly converting the alternating current output to the direct current input, the rectifier assembly comprising:

opposing first and second conductive segments extending in an axial direction;

axially-spaced, non-conductive supports coupling the first and second conductive segments to define an interior between the first and second conductive segments, wherein each non-conductive support has radially arranged mounting connectors;

a set of axially aligned diode seats comprising a first diode seat disposed on the first conductive segment and facing the interior, and a second diode seat disposed on the second conductive segment and facing the interior;

a diode stack comprising a first diode seated with the first diode seat and a second diode seated with the second diode seat, each diode having an input electrically coupled with the alternating current output and outputs electrically coupled with each respective conductive segments; and an input bus bar for each set of diode seats, wherein the input bus bar is electrically isolated from each of the conductive segments by the non-conductive support and at least a portion of the input bus bar is mounted to at least one of the mounting connectors of the non-conductive support.

2. The rectifier assembly of claim 1 wherein the diodes are configured in a full bridge configuration.

3. The rectifier assembly of claim 1 further comprising a set of diode seats for each alternating current phase of the alternating current output.

4. The rectifier assembly of claim 1 further comprising an output bus bar for each of the first and second conductive segments, each output bus bar electrically coupling the respective conductive segment to the direct current input.

5. The rectifier assembly of claim 1 wherein the mounting connectors are wire guides.

6. The rectifier assembly of claim 1 wherein the first and second conductive segments further defines axially extending thermally conductive fins opposite of the diode seats.

7. The rectifier assembly of claim 6 wherein the fins of the rectifier assembly defines at least one passage for coolant to traverse.

8. The rectifier assembly of claim 1 wherein the diode stack further comprises a conductive compressive element seated with at least one of the first or second diode seats, and is configured to maintain, by compressive force, the conductive contacts of each diode and, respectively, the alternating current output and conductive segment.

9. The rectifier assembly of claim 1 further comprising a conductive plate having opposing faces, with each face having a diode seat, wherein the plate is positioned between the first and second diodes of the diode stack, and wherein each of the opposing faces receive the correspondingly adjacent diode.

10. The rectifier assembly of claim 9 further comprising an input bus bar electrically coupling each conductive plate to the alternating current output.

11. The rectifier assembly of claim 1 wherein each of the non-conductive supports further comprises at least one axial opening, such that the interior of the rectifier assembly defines at least one passage for coolant to traverse.

* * * * *